(12) United States Patent
Froggatt et al.

(10) Patent No.: US 6,545,760 B1
(45) Date of Patent: Apr. 8, 2003

(54) APPARATUS AND METHOD FOR MEASURING STRAIN IN OPTICAL FIBERS USING RAYLEIGH SCATTER

(75) Inventors: Mark E. Froggatt, Yorktown, VA (US); Jason P. Moore, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/535,659

(22) Filed: Mar. 24, 2000

Related U.S. Application Data

(60) Provisional application No. 60/127,603, filed on Mar. 25, 1999.

(51) Int. Cl.$^7$ .............................. G01B 9/02; G01L 1/24
(52) U.S. Cl. ..................................... 356/477; 356/35.5
(58) Field of Search ........................ 73/800; 356/35.5, 356/477; 250/227.19, 227.27

(56) References Cited

U.S. PATENT DOCUMENTS

| | | |
|---|---|---|
| 5,054,935 A | 10/1991 | Tanabe et al. |
| 5,272,334 A | 12/1993 | Sal |
| 5,276,501 A | 1/1994 | McClintock et al. |
| 5,361,130 A | 11/1994 | Kersey et al. |
| 5,426,297 A | 6/1995 | Dunphy et al. |
| 5,798,521 A | 8/1998 | Froggatt |

OTHER PUBLICATIONS

Froggatt and Moore, "High–spatial–resolution distributed strain measurement in optical fiber with Rayleigh scatter" Apr. 1, 1998, Applied Optics, vol. 37, No. 10, pp. 1735–1740.*

Posey Jr., Johnson, Vohra "Rayleigh Scattering Based Distributed Sensing System for Structural Monitoring" Oct. 11, 2000 SPIE vol. 4185, pp. 678–681.*

M. Froggate et al., "Distributed measurement of static strain in an optaical fiber with multiple Bragg gratings at nominally equal wavelengths", Applied Optics, vol. 37, No. 10, Apr. 1, 1998, pp. 1741–1746.

M. Froggatt et al., "High–spatial–resolution distributed strain–measurement in optical fiber with Rayleight scatter", Applied Optics, vol. 37, No. 10. Apr. 1, 1998, pp. 1735–1740.

U. Glombitza et al, "Coherent frequency–domain reflectometry for characterization of simgle–mode integrated–optical waveguides", Journal of Lightwave Technology, Aug. 1993, 9 pgs.

Research International Brochure, "Ferret II Spectral Scanning PC Card", 1996, 2 pgs.

D. A. Jackson, "Recent progress in momomode fibre–optic sensors", Meas. Sci. Technol., 5, (*1994*), 621–638.

* cited by examiner

Primary Examiner—Samuel A. Turner
Assistant Examiner—Patrick Connolly
(74) Attorney, Agent, or Firm—Kurt G. Hammerle; Robin W. Edwards

(57) ABSTRACT

An apparatus and method for measuring strain in an optical fiber using the spectral shift of Rayleigh scattered light. The interference pattern produced by an air gap reflector and backscattered radiation is measured. Using Fourier Transforms, the spectrum of any section of fiber can be extracted. Cross correlation with an unstrained measurement produces a correlation peak. The location of the correlation peak indicates the strain level in the selected portion of optical fiber.

10 Claims, 5 Drawing Sheets

«APPARATUS AND METHOD FOR MEASURING STRAIN IN OPTICAL FIBERS USING RAYLEIGH SCATTER»

CLAIM OF BENEFIT OF PROVISIONAL APPLICATION

Pursuant to 35 U.S.C. Section 119, the benefit of priority from provisional application 60/127,603, with a filing date of Mar. 25, 1999, is claimed for this non-provisional application.

ORIGIN OF THE INVENTION

The invention described herein was made by employees of the United States Government and may be used by or for the Government for governmental purposes without the payment of any royalties thereon or therefor.

BACKGROUND OF THE INVENTION

1. Field of the Invention

The present invention is generally related to an apparatus and method for measuring the strain of optical fibers using Rayleigh scattered light.

2. Problem to be Solved

It is often desirable to measure optical fibers for strain that occurs when the optical fibers are subjected to tension or compression. Strain can occur if the optical fiber is subject to physical forces that stretch, contort or contract the optical fiber. Stress to the optical fibers can also occur as a result of variations in temperature of the environment within which the optical fiber is located. Such physical forces and temperature variations are typically found in aerospace environments such as aircraft or spacecraft.

Conventional systems and methods of measuring distributed strain in optical fibers have relied upon some alteration of the existing fiber. One conventional system uses extrinsic Fabry-Perot interferometers which require construction of small air gaps within the fiber. Another conventional system uses intrinsic Fabry-Perot interferometers which require the construction of two reflecting surfaces in the optical fiber generally by use of a fusion splice. Another conventional system utilizes Bragg gratings which are produced by UV (ultraviolet) exposure causing periodic changes in the index of refraction of the fiber core. Such alterations to the optical fiber are costly, time consuming and significantly weaken the fiber, making installation difficult and expensive. What is needed is an apparatus and method for measuring the strain in optical fibers that can use relatively inexpensive, mass produced and rugged commercial grade single mode optical fibers.

It is therefore an object of the present invention to provide a new and improved apparatus and method for measuring strain in optical fibers.

It is a further object of the present invention to provide a new and improved apparatus and method for measuring strain in optical fibers with a relatively high degree of accuracy.

It is yet another object of the present invention to provide a new and improved apparatus and method for measuring strain in optical fibers that may be implemented cost effectively.

Still other objects and advantages of the present invention will in part be obvious and will in part be apparent from the specification.

SUMMARY OF THE INVENTION

The above and other objects and advantages, which will be apparent to one of skill in the art, are achieved in the present invention which is directed to an apparatus and method for measuring strain in an optical fiber using the spectral shift of Rayleigh scattered light. The interference pattern produced by an air gap reflector and backscattered radiation is measured. Using Fourier Transforms, the spectrum of any section of fiber can be extracted. Cross correlation with a reference zero-load (i.e. zero-strain or zero-compression) measurement produces a correlation peak. The location of the correlation peak indicates the strain level in the selected portion of optical fiber.

In one aspect, the present invention is directed to a method for measuring the strain in an optical fiber comprising the steps of providing an optical radiation source configured to transmit optical radiation over a plurality of contiguous predetermined wavelength ranges, and an optical detector, splitting the optical radiation into a reference radiation portion and a measurement radiation portion, transmitting the measurement radiation portion into an optical fiber having non-zero Rayleigh scatter, collecting the backward Rayleigh scattered light, joining the reference and measurement radiation portions at the input of the optical detector in order to produce an interference fringe, measuring the interference fringe over a plurality of wavelengths to produce a reference pattern, measuring the interference fringe over a plurality of wavelengths after the optical fiber has been subjected to strain or compression so as to produce a measurement pattern, computing the Fourier Transform of the reference pattern as a function of wavenumber so as to produce a reference spatial domain response, computing the Fourier Transform of the measurement pattern as a function of wavenumber so as to produce a measurement spatial domain response, selecting the complex points associated with a segment of the measurement spatial domain response and a corresponding segment of the reference spatial domain response, performing an inverse Fourier Transform of the segment of the measurement spatial domain response to provide a first transformation, performing an inverse Fourier Transform of the segment of the reference spatial domain response to provide a second transformation, determining the complex cross-correlation between the first and second transformations, determining the amplitude of the cross-correlation as a function of wavenumber shift, and determining the wavenumber shift corresponding to a peak of the amplitude of the cross-correlation wherein such wavenumber shift indicates strain in the segment of the optical fiber that corresponds to the segments of the measurement and reference spatial domain responses.

In a related aspect, the present invention is directed to a method for measuring the strain in an optical fiber comprising the steps of providing an optical radiation source configured to transmit optical radiation over a plurality of contiguous predetermined wavelength ranges, and an optical detector, splitting the optical radiation into a reference radiation portion and a measurement radiation portion, transmitting the measurement radiation portion into an optical fiber having non-zero Rayleigh scatter, collecting the backward Rayleigh scattered light, joining the reference and measurement radiation portions at the input of the optical detector in order to produce an interference fringe, measuring the interference fringe over a plurality of wavelengths to produce a reference pattern, measuring the interference fringe over a plurality of wavelengths after the optical fiber has been subjected to strain or compression so as to produce a measurement pattern, computing the Fourier Transform of the reference pattern as a function of wavenumber so as to produce a reference spatial domain response, computing the Fourier Transform of the measurement pattern as a function of wavenumber so as to produce a measurement spatial domain response, selecting the complex points associated with a segment of the measurement spatial domain response and a corresponding segment of the reference spatial domain response, computing the complex conjugate of all complex points in the selected segments of the spatial domain responses of the reference and measurement patterns, computing the product of the complex conjugate of all complex points in the selected segment of the reference spatial domain responses and the complex conjugate of all complex points in the selected segment measurement patterns wherein the product comprises an array of product values, computing the inverse Fourier Transform of the array of product values, computing the amplitude of the array as a function of wavenumber shift, and determining the wavenumber shift corresponding to the peak of the amplitude of the array wherein the wavenumber shift indicates strain in the section of optical fiber that corresponds to the segments of the measurement and reference spatial domain responses.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

In describing the preferred embodiments of the present invention, reference will be made herein to FIGS. 1–5 of the drawings in which like numerals refer to like features of the invention.

As discussed above, the present invention is directed to an apparatus and method for effecting high-spatial resolution distributed strain measurement in optical fibers using Rayleigh scattered light. Specifically, the apparatus and method of the present invention measures the strain in an unaltered, commercial grade, single mode fiber at multiple locations by measuring the local shift in the Rayleigh spectral shift. Specifically, the method of the present invention effects a comparison of the spectrum before and after loading (i.e. tension or compression) the fiber using a complex cross-correlation of the spectra corresponding to load and zero-load conditions.

Figure 1:
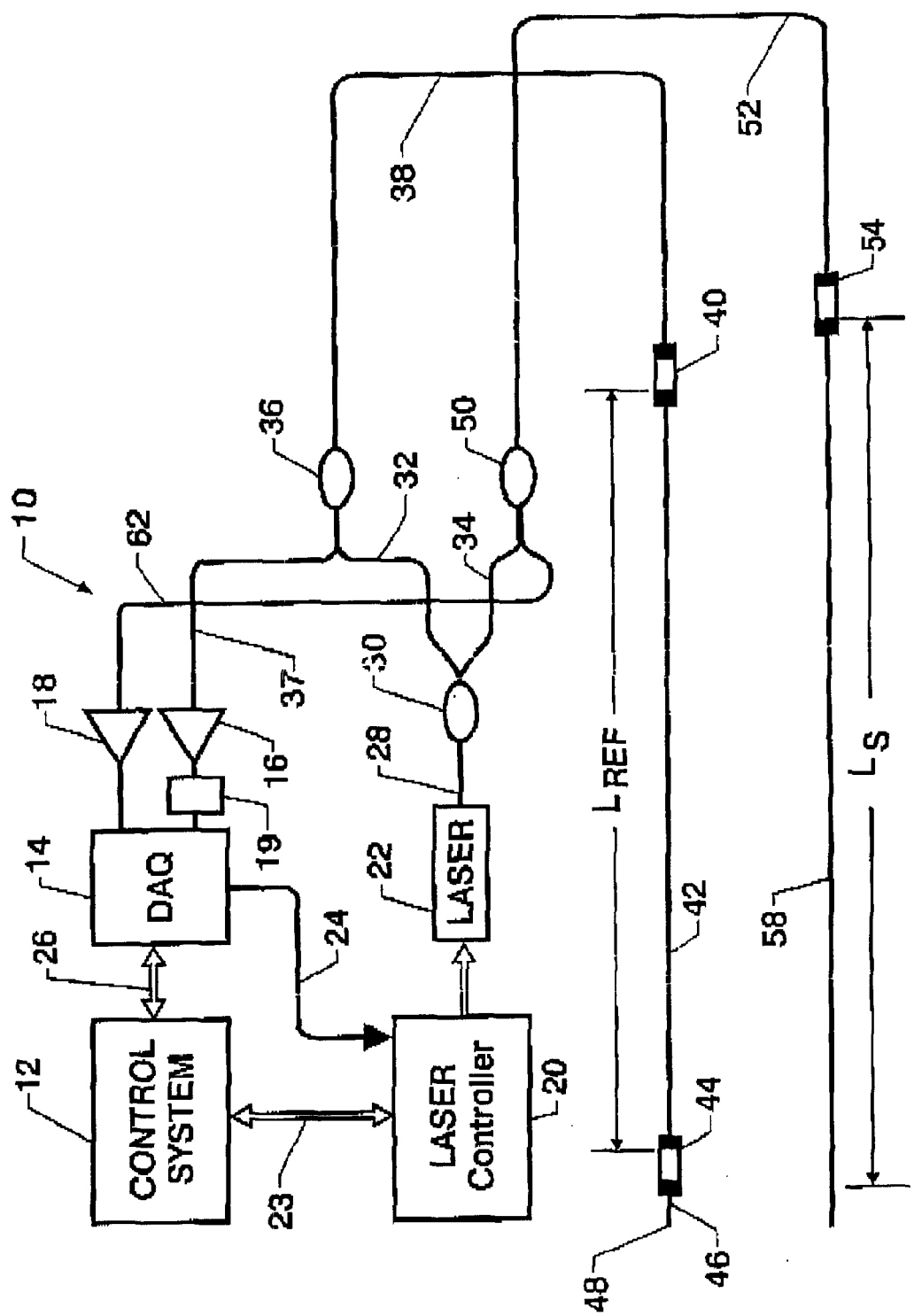
FIG. 1 is a block diagram of the measurement apparatus of the present invention.

Referring to FIG. 1, apparatus 10 of the present invention generally comprises control system 12, data acquisition (DAQ) circuit 14, detectors 16 and 18, circuit 19, laser controller 20, and coherent light source or tunable laser 22.

Control system 12 performs several functions including receiving and analyzing digital data outputted by DAQ circuit 14 and outputting control signals to laser controller 20. Control system 12 outputs control signals over data bus 23 for input to laser controller 20. Control system 12 may be implemented by a microprocessor or computer having a random access memory (RAM). The RAM should be large enough to perform signal processing algorithms such as Fourier Transform analysis. Control system 12 may be implemented by any one of the many commercially available personal computers such as the Power Macintosh 8100 manufactured by Apple Computer Inc. of Cupertino, Calif. It is highly preferable that the RAM have a size of at least 40 megabytes. In a preferred embodiment, the functions of control system 12 are implemented by a software program that provides built-in hardware interfaces, displays and signal processing algorithms. In a most preferred embodiment, the software program is configured with a programming language such as Lab View™. Lab View™ provides built-in hardware interfaces, displays and signal processing algorithms that significantly reduce the total amount of programming actually required.

Laser controller 20 is a commercially available external cavity tunable laser controller and includes a piezoelectric tuning (PZT) system. Laser controller 20 comprises circuitry to provide the drive current, temperature stabilization, picomotor tuning and drive voltage for the PZT system. Positioning the picomotor is accomplished through commands outputted by control system 12 over data bus 23. These commands are inputted into a data input port of laser controller 20. The PZT system receives an analog control voltage 24 from DAQ circuit 14 and tunes laser 22 to a specific wavelength. The actual wavelength depends upon the magnitude of the analog control voltage 24. The PZT tunes laser 22 over a predetermined range of wavelengths in response to a corresponding range of analog control voltages.

Laser controller 20 may be realized by a commercially available laser controller. In a most preferred embodiment, laser controller 20 has operational characteristics similar to the New Focus 6200 External Cavity Tunable Laser Controller, manufactured by New Focus of Santa Clara, Calif. The New Focus 6200 Controller has a GPIB port for receiving data from data bus 23. The New Focus 6200 Controller also includes a PZT system that is able to tune laser 22 over the range of 0.29 nm (nanometer). The operation of laser controller 20 will be discussed below in detail.

Laser 22 may be realized by a commercially available tunable laser. In a most preferred embodiment, laser 22 has operational characteristics similar to the New Focus 6213 Laser. The New Focus 6213 Laser is tunable over its 1310 nm gain bandwidth, has a linewidth of about 100 KHz and output power of about 1 mW (milliwatt). The operation of laser 22 will be discussed below.

Detectors 16 and 18 are optical receivers. Each detector is configured to detect and convert the power or intensity of interference fringes at the detector's input into a voltage. In a preferred embodiment, each detector 16 and 18 has operational characteristics similar to the commercially available New Focus 2011 Front End Optical Receiver.

The interference fringe at detector 18 is measured over a plurality of wavelengths to produce a reference pattern. This reference pattern is accomplished by implementing the following steps. The first step entails tapping a portion of the optical radiation outputted by tunable laser 22. Next, the tapped portion of the optical radiation is split into a first optical radiation portion and a second optical radiation portion. The next step entails transmitting the first optical radiation portion through a first delay and the second optical radiation portion through a second delay. Referring to FIG. 1, the first delay is realized by reflector 40 and the second delay is realized by reflector 44. Reflectors 40 and 44 reflect the first and second optical radiation portions, respectively. Thereafter, the reflected optical radiation portions are joined or merged on optical detector 16 so as to produce interference fringes. These interference fringes are used to measure changes in the laser wavelength of tunable laser 22. The last step entails correlating the intensity measurements of the reference pattern using the measured changes in the laser wavelength.

The output of detector 16 is inputted into circuit 19. Circuit 19 converts the detected reference interference fringe into a clock pulse. In one embodiment, circuit 19 comprises an operational amplifier that has operational characteristics similar to the commercially available LM741, LF147, and LF347 operational amplifiers manufactured by National Semiconductor, Texas Instruments, and Advanced Micro Devices. In one embodiment, the waveform outputted by circuit 19 has a "High" signal level and "Low" signal level that corresponds to a TTL "High" signal level and a TTL "Low" signal level, respectively.

DAQ circuit 14 comprises an analog-to-digital converter (ADC) and a digital-to-analog converter (DAC). Data bus 26 transfers data between DAQ circuit 14 and control system 12. The ADC circuit includes a "Start Convert" signal input. When a signal having a predetermined level is inputted into the "Start Convert" signal input, the analog-to-digital conversion function of the ADC is implemented. The output of circuit 19 is inputted into the "Start Convert" signal input. Thus, the ADC of DAQ circuit 14 converts the output of detector 16 into a multi-bit signal upon receipt of the clock pulse outputted by circuit 19. As a result, the data signals inputted into DAQ 14 are sampled at uniform wavelength $$\Delta\lambda_{fringe} = \lambda^2/2nL_{ref}$$

wherein $\lambda$ is the wavelength of the output of tunable laser 22, $L_{REF}$ is the length of optical fiber 42, and n is the index of refraction of the optical fiber 42. Typically, n is about 1.46.

Since high resolution is desired, it is highly preferable that the multi-bit signal comprises at least sixteen (16) bits. The analog-to-digital conversions are made at a predetermined conversion rate. Preferably, the conversion rate is between about 10 kHz and 20 kHz. The DAC within DAQ circuit 14 receives a multi-bit signal over data bus 26 from control system 12 and converts the multi-bit signal into analog control voltage 24. In order to achieve high resolution, the multi-bit signal input into the DAC circuit is comprised of at least twelve (12) bits. As discussed above, analog control voltage 24 controls the tuning of the PZT system of controller 20. DAQ circuit 14 may be realized by a commercially available data acquisition card. In a preferred embodiment, DAQ circuit 14 has operational characteristics similar to the commercially available National Instruments NB-MIO-16XH-42 Data Acquisition and Control Card manufactured by National Instruments of Austin, Tex. The NB-MIO-16XH-42 can convert analog signals on two (2) channels at a 12 KHz rate to a pair of sixteen (16) bit signals.

Referring to FIG. 1, laser 22 transmits optical radiation or lightwaves through optical fiber 28 and into coupler 30. Coupler 30 is a 2/1 fiber optic coupler. About 10% of the light outputted by coupler 30 passes through optical fiber 32. The light in optical fiber 32 passes through fiber optic coupler 36 and optical fiber 38. Air gap reflector 40 is located in the end of optical fiber 38. In a preferred embodiment, air gap reflector 40 is formed by two (2) cleaved ends of fibers in a Norland™ Splice Tube. Air gap reflector 40 produces a minimal reflection, typically about 7%. Optical fiber 42 extends from the exit of reflector 40. Optical fiber 42 has a predetermined length and is referred to herein as reference length $L_{REF}$. The transmitted light continues down optical fiber 42 until it encounters air-gap reflector 44 located at the end of optical fiber 42. Air gap reflector 44 is constructed in a manner similar to air-gap reflector 40. Optical fibers 38, 42 and reflectors 40, 44 form a "reference cavity". Optical fiber 46 extends from the exit of air-gap reflector 44. End 48 of optical fiber 46 is shattered so that no light is reflected back down optical fiber 42. The light reflected from air gap reflector 40 passes through coupler 36. Similarly, the light reflected from air-gap reflector 44 passes through coupler 36. The light reflected from reflector 40 interferes with the light reflected from reflector 44 and produces a fringe or interference fringe (also known as an interference fringe pattern). As used herein, the terms fringe or interference fringe are defined as the change from high to low intensity when the interference shifts from a constructive interference to a destructive interference. The interference fringe is inputted into detector 16 via optical fiber 37. This interference fringe is referred to herein as a "reference interference fringe". Detector 16 detects the intensity of the interference fringe. The intensity is the power of the resulting interference fringe. Detector 16 converts the intensity (or power) into current which is then converted into a voltage. The voltage is inputted into circuit 19 which converts the voltage into the clock pulse, as described above, which is inputted into the "Start Convert" input so as to enable the ADC of DAQ 14.

The remaining 90% of the light outputted by coupler 30 passes through coupler 30, optical fiber 34 and optical coupler 50. The light exiting optical coupler 50 travels down optical fiber 52. In a preferred embodiment the length of optical fiber 52 is kept to a minimum. It is highly preferable that optical fiber 52 contain no reflections. Air gap reflector 54 is located at the end of optical fiber 52 and is formed in a manner similar to air gap reflectors 40 and 44 discussed above. Specifically, the end of optical fiber 52 and optical fiber 58 are cleaved and inserted into a Norland Splice Tube to form reference reflector 54. Air gap reflector 54 is referred to as a reference reflector. Optical fiber 58 is a "sensing section" and is the optical fiber under test.

The light that is not reflected by the reference reflector 54 travels through optical fiber 58 and is scattered by small random fluctuations of the index of refraction in the fiber core. This "scattering" of the light is the Rayleigh scattered light. The end of optical fiber 58 is preferably shattered so that no light is reflected. The Rayleigh scatter light and the light reflected from reference air gap reflector 54 return through optical fiber 52 and pass through optical coupler 50. The output of optical coupler 50 is coupled to optical fiber 62 which passes the light into detector 18. The Rayleigh scattered light interferes with the light reflected from reference air gap reflector 54 thereby producing an interference fringe. This fringe is referred to herein as the "measurement interference fringe". The total intensity of this measurement interference fringe depends upon the phase amplitude of the lightwaves reflected from reflector 54 and the Rayleigh scattered light. If the wavelength of optical fiber 58 changes due to strain or compression, the amplitude and phase of the Rayleigh scattered light will also change thereby resulting in variations in the power of the interference fringe at the input to detector 18.

Detector 18 converts the power (or intensity) of this interference fringe into a voltage level. The ADC of DAQ circuit 14 converts this voltage into a multi-bit signal upon receipt of the waveform outputted by circuit 19. As discussed above, this multi-bit signal preferably comprises 16 (sixteen) bits. The multi-bit signal is inputted into control system 12 through data bus 26.

The method of the present invention will now be discussed in detail. For purposes of the ensuing discussion, the components of the apparatus of the present invention will have the operational characteristics of the commercially available components discussed above. However, it is to be understood that other components having similar operational characteristics may be used to implement the method of the present invention. For example, laser 22 can be implemented by any coherent light source that has wavelength tuning capability.

The first step of the method of the present invention comprises setting the wavelength of tunable laser 22 to the beginning of the predetermined sweep range. To effect setting the wavelength of tunable laser 22, control system 12 outputs a command over data bus 23 which is inputted into the data input (the GPIB port) of laser controller 20. The command represents a predetermined initial position of the picomotor of laser controller 20.

The next step entails sweeping tunable laser 22 through a wavelength range that is determined by the tuning range of the PZT. The PZT of laser controller 20 has a tuning range of about 0.29 nm as discussed above. It is highly preferred that PZT be swept over a range that is less than the maximum tuning range of the PZT in order to avoid distortion. Thus, the PZT is swept over a range of 0.23 nm. In order to accomplish this, control system 12 outputs a series of multi-bit signals over data bus 26 to DAQ circuit 14. These multi-bit signals are digital representations of analog voltages within a predetermined range. The voltage range depends upon the operational characteristics of laser controller 20. For example, if laser controller has operational characteristics of the New Focus 6200 Controller discussed above, then a voltage range of −3 volts to +3 volts would be suitable to effect a sweep range of 0.23 nm. The multi-bit signals are inputted into the DAC of DAQ circuit 14 which converts the multi-bit signals into analog voltages within the predetermined range. The analog voltages are inputted into the PZT voltage input of laser controller 20.

As the wavelength of tunable laser 22 is swept over the range based on the PZT tuning range, the intensities of the reference interference fringes emanating from the reference cavity (described above) and the measurement interference fringes emanating from sensing optical fiber 58 are detected by detectors 16 and 18, respectively, which convert the intensities of the measurement interference fringes into analog voltages as discussed above. The analog voltages outputted by detector 18 are inputted into the ADC of DAQ circuit 14 which converts the analog voltages into respective digital representations of the intensities of the measurement interference fringe upon receipt of the clock signal outputted from circuit 19. These digital representations are transferred to control system 12 via data bus 26. Control system 12 creates arrays of these digital representations and the corresponding sample times or sample numbers, i.e. each digital representation has a corresponding sample number. The utilization of the waveform outputted by circuit 19 to drive the ADC circuit board of DAQ 14 effects elimination of non-linearities from the measurement interference fringe.

In accordance with the present invention, the steps described above are implemented to produce a measurement fringe that corresponds to sensing optical fiber 58 having zero-load conditions, i.e. zero tension and zero compression. This measurement fringe is referred to herein as a "zero-load measurement fringe". Sampling the sampled zero-load measurement fringe provides a reference wavenumber domain waveform that corresponds to sensing optical fiber 58 having zero-load conditions. Next, the reference wavenumber domain waveform is transformed into a reference spatial domain waveform. This is accomplished by performing an FFT (Fast Fourier Transform) on the zero-load measurement fringe so as to transform the sampled zero-load measurement fringe from the wavenumber domain to the spatial domain. As described above, the FFT on the zero-load measurement fringe array is effected by control system 12 via execution of the appropriate software routine. This is actually achieved by performing a Discrete Fourier Transform (DFT) on the digital representations of the intensities of the zero-load measurement interference fringe which are stored in the arrays described above. The reference spatial domain waveform is stored in memory in control system 12.

Figure 2:
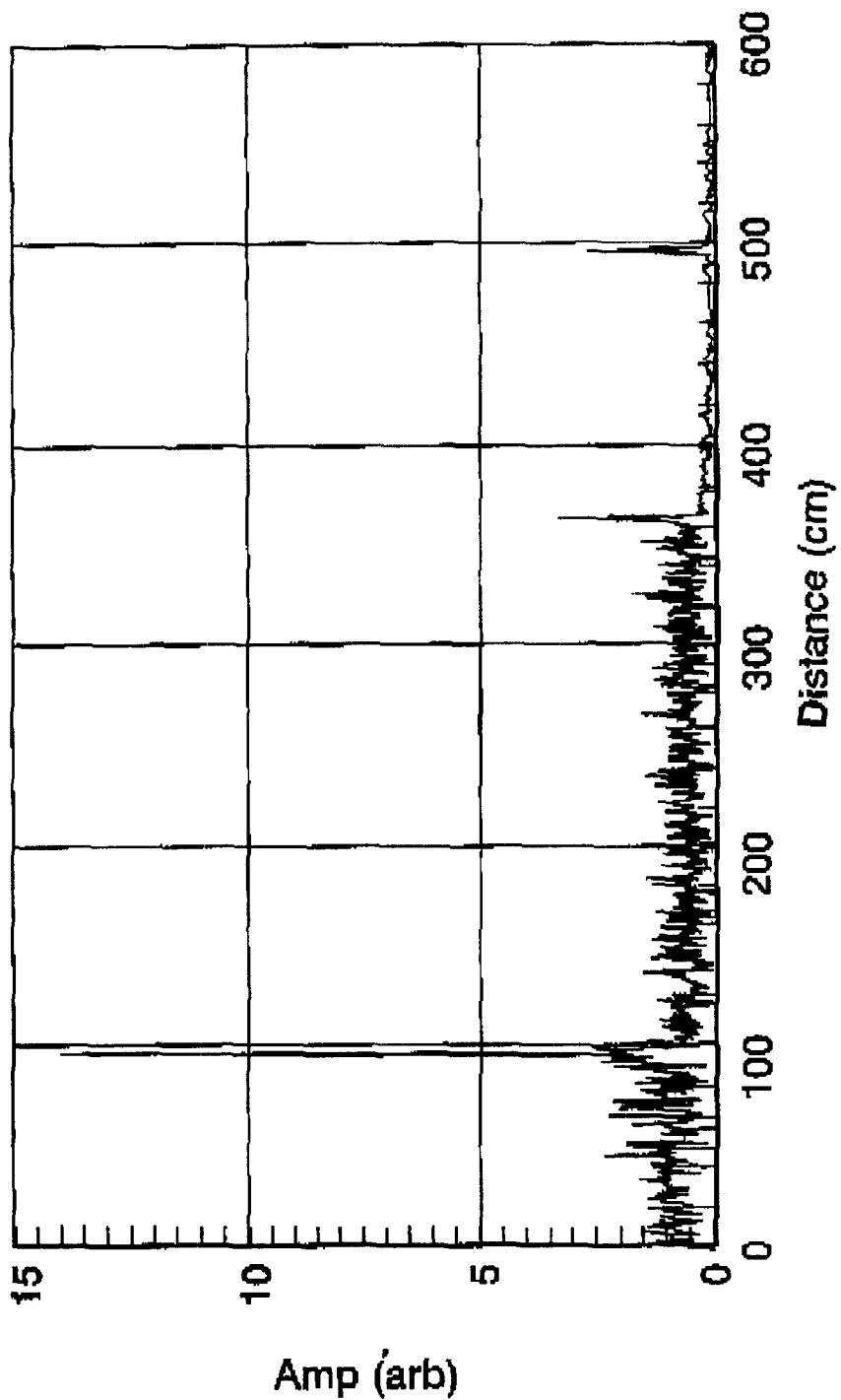
FIG. 2 is a graph illustrating the amplitude of the Rayleigh scattered light as a function of distance of the optical fiber.

Next, tunable laser 22 is swept through the wavelength range as described above to produce arrays of measurement fringe data that correspond to sensing optical fiber 58 having possible load conditions, i.e. tension or compression. An FFT (Fast Fourier Transform) is performed on the measurement fringe so as to transform the sampled measurement fringe from the wavenumber domain to the spatial domain. As described above, the FFT of the measurement fringe array is effected by control system 12 via execution of the appropriate software routine. This is actually achieved by performing a Discrete Fourier Transform (DFT) on the digital representations of the intensities of the measurement interference fringe which are stored in the arrays described above. FIG. 2 shows the measurement spatial domain waveform that is produced by this step. Since the phase information is retained, the spectrum of any section of optical fiber 58 can be converted back into the wavelength domain.

Next, the measurement spatial domain waveform is analyzed to select a particular portion thereof that corresponds to a particular section of optical fiber 58 in which strain or compression is to be measured.

The next step entails analyzing the reference spatial domain waveform in order to locate the particular portion thereof that corresponds to the particular section of optical fiber 58 in which strain or compression is to be measured.

Next, the selected portions of the reference and measurement spatial domain waveforms are converted back into the wavelength domain. This is accomplished by performing an Inverse Fourier Transform (IFT) on the selected portions of both the spatial domain waveforms. As a result, the selected portions of both reference and measurement spatial domain waveforms are converted to the wavenumber domain thereby yielding a reference wavenumber domain response and a measurement wavenumber domain response.

The next step entails performing a cross-correlation between the reference wavenumber domain response and a measurement wavenumber domain response.

The next step is to analyze the resulting cross-correlation response to determine the location of the cross-correlation peak. If the cross-correlation peak aligns with zero, then the selected portion of optical fiber 58 is neither under tension nor compression (i.e. zero-load). If cross-correlation peak is positioned at a point that is less than zero, then optical fiber 58 is under compression. If cross-correlation peak is positioned at a point that is greater than zero, then optical fiber 58 is under tension.

Further theoretical description of the present invention is found in M. Froggatt and J. Moore, "High-spatial-resolution distributed strain measurement in optical fiber with Rayleigh scatter", Appl. Opt. 37, 1735–1740 (1998), herein incorporated by reference.

Test Results

Figure 3:
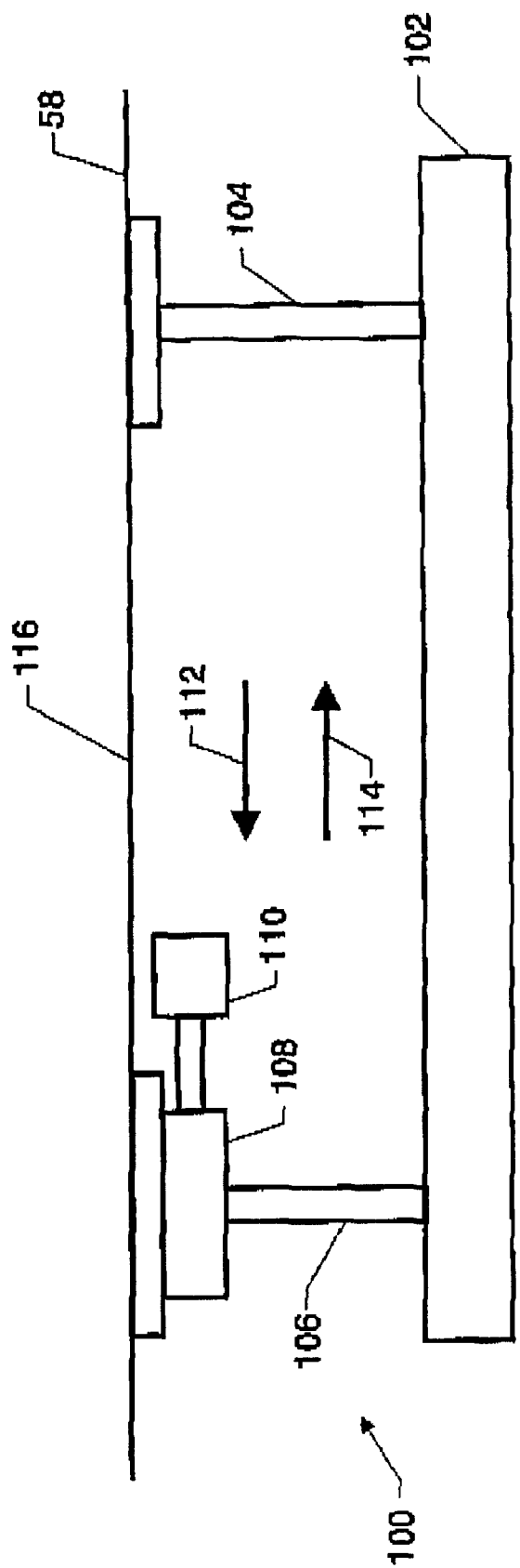
FIG. 3 is a diagram illustrating a test apparatus used to strain a section of optical fiber with minimal application of radial stress by use of two translation stages and two fixed blocks.
Figure 4A:
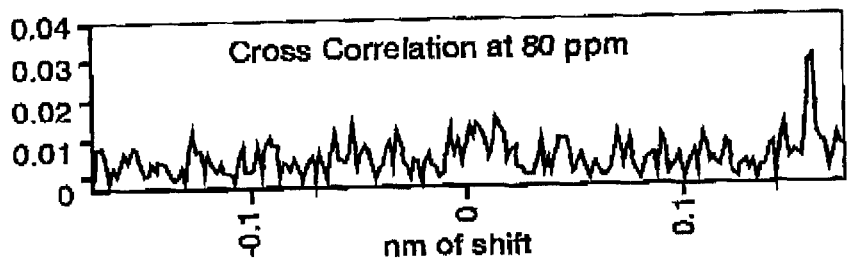
FIGS. 4A–4E are graphs illustrating the cross-correlation results for compression, no-load and tension in a particular section of an optical fiber under test.
Figure 4B:
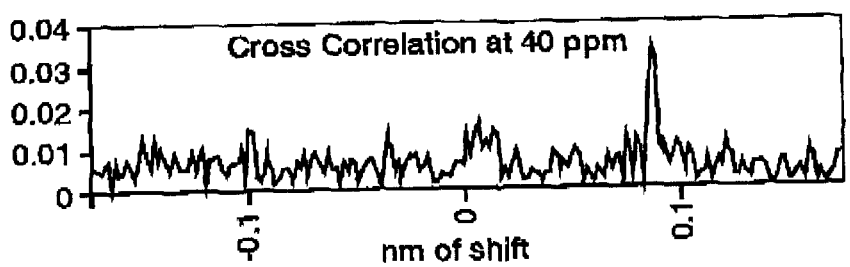
Figure 4C:
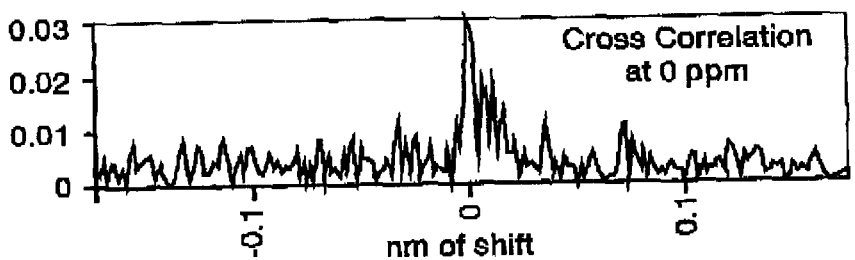
Figure 4D:
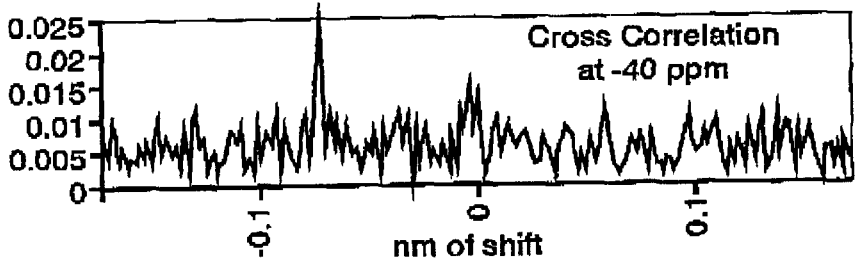
Figure 4E:
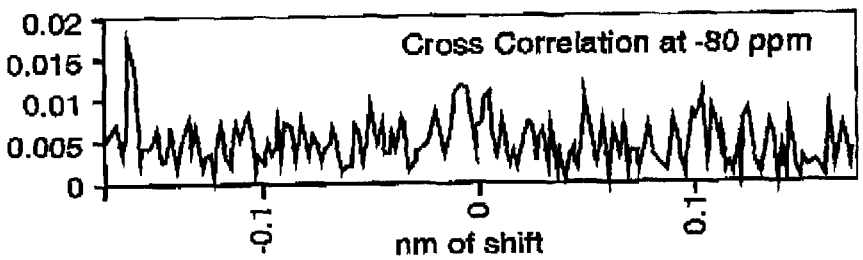

The apparatus and method of the present invention were used to measure the strain in a section of an unaltered commercial grade fiber. Referring to FIG. 3, there is shown test apparatus 100 for creating strain in a section of the unaltered commercial grade fiber. Test apparatus 100 comprises frame 102, stationary stage 104, translation stage 106, and micrometer 108. Micrometer 108 is mounted to translation stage 106. Micrometer 108 includes adjustment mechanism 110 which can be used to control micrometer 108. Micrometer 108 effects movement of translation stage 106 with respect to stationary stage 104. Thus, when adjustment mechanism 110 is adjusted, translation stage 106 moves either in the direction indicated by arrow 112 or in the direction indicated by arrow 114. Optical fiber 58 is removably attached to translation stage 106 and stationary stage 104. Thus, when translation stage 106 moves in the direction indicated by arrow 112, strain is created in section 116 of optical fiber 58. Effective compression was achieved by pre-tensioning section 116 of optical fiber 58.

Figure 5:
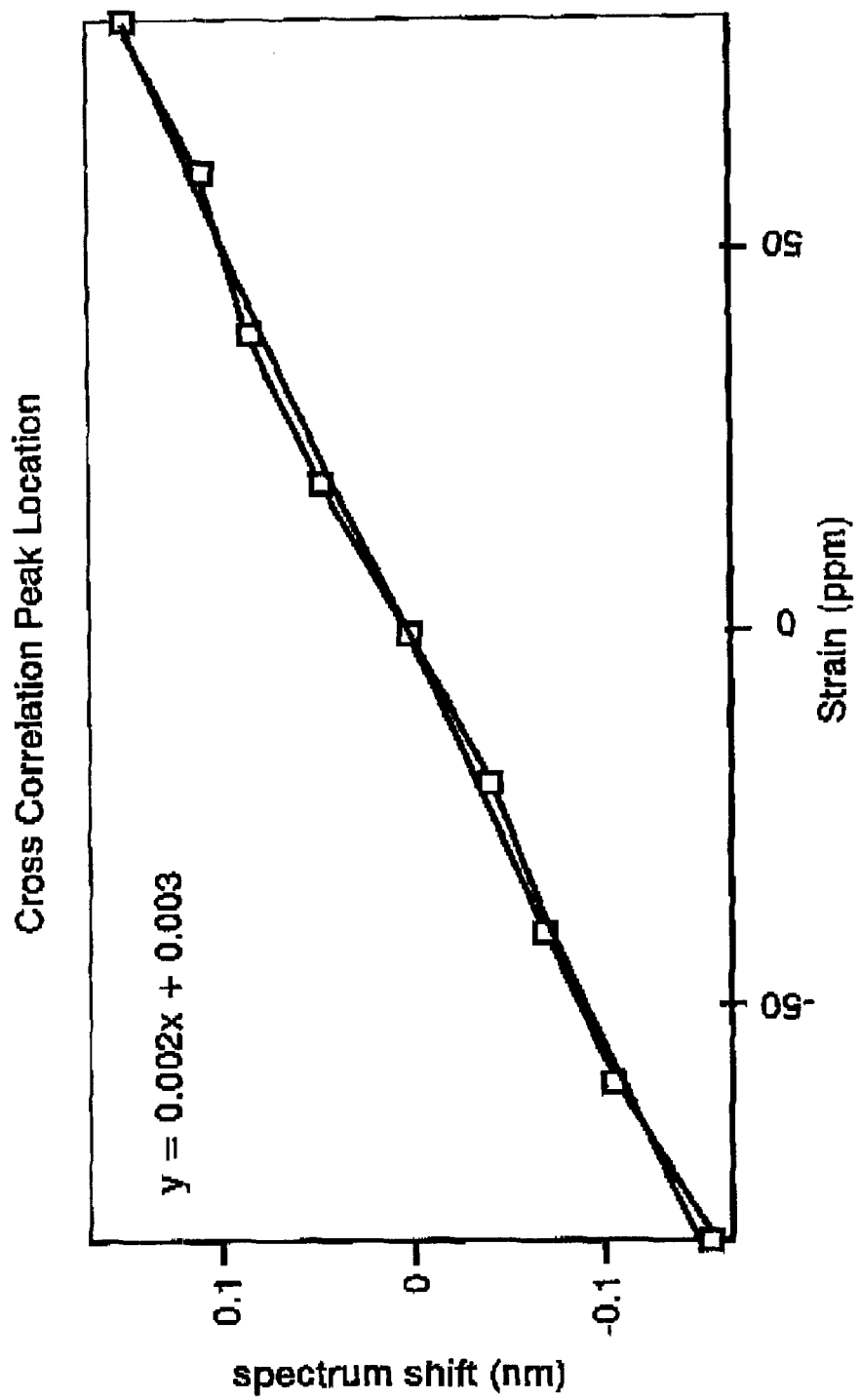
FIG. 5 is a graph illustrating spectral shift (i.e. cross correlation peak location) as a function of load (i.e. tension or compression).

The first step in the test procedure was creating a reference (i.e. zero load) spatial domain waveform that was used for the cross-correlation step. Next, testing apparatus 100 was used to apply strain or compression levels of −80 ppm, −40 ppm, 0 ppm, 40 ppm, and 80 ppm to section 116 of optical fiber 58. FIGS. 4A–4E show the resulting cross-correlation for each of the aforementioned strain or compression levels. FIG. 5 shows the resulting spectral shift (location of cross-correlation peak) as a function of load (i.e. stress or compression).

Thus, the method of the present invention enables measurement of the reflection spectrum of each arbitrarily defined section of optical fiber 58 so as to provide the distributed measurement of strain. The shifting of the correlation peak is a highly accurate measurement of the strain in the optical fiber 58. As previously described herein, the spectral response of any section of optical fiber 58 is a random function of complex numbers. This random function does not vary with time, and strain on the fiber results in a simple shift as a function of wavelength of the spectral response.

In an alternate embodiment, the method of the present invention comprises the steps of providing an optical radiation source configured to transmit optical radiation over a plurality of contiguous predetermined wavelength ranges, and an optical detector, splitting the optical radiation into a reference radiation portion and a measurement radiation portion, transmitting the measurement radiation portion into an optical fiber having non-zero Rayleigh scatter, collecting the backward Rayleigh scattered light, joining the reference and measurement radiation portions at the input of the optical detector in order to produce an interference fringe, measuring the interference fringe over a plurality of wavelengths to produce a reference pattern, measuring the interference fringe over a plurality of wavelengths after the optical fiber has been subjected to strain or compression so as to produce a measurement pattern, computing the Fourier Transform of the reference pattern as a function of wavenumber so as to produce a reference spatial domain response, computing the Fourier Transform of the measurement pattern as a function of wavenumber so as to produce a measurement spatial domain response, selecting the complex points associated with a segment of the measurement spatial domain response and a corresponding segment of the reference spatial domain response, computing the complex conjugate of all complex points in the selected segments of the spatial domain responses of the reference and measurement patterns, computing the product of the complex conjugate of all complex points in the selected segment of the reference spatial domain responses and the complex conjugate of all complex points in the selected segment measurement patterns wherein the product comprises an array of product values, computing the inverse Fourier Transform of the array of product values, computing the amplitude of the array as a function of wavenumber shift, and determining the wavenumber shift corresponding to the peak of the amplitude of the array wherein the wavenumber shift indicates strain in the section of optical fiber that corresponds to the segments of the measurement and reference spatial domain responses.

The present invention can be embodied in the form of computer processor readable program code embodied in a computer processor usable medium, such as floppy diskettes, CD-ROMs, hard drives, or any other computer-readable storage medium, wherein, when the computer program code is loaded into and executed by a computer, the computer becomes an integral part of an apparatus for practicing the invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for measuring the strain in an optical fiber comprising the steps of:
   (a) providing an optical radiation source configured to transmit optical radiation over a plurality of contiguous predetermined wavelength ranges, and an optical detector;
   (b) splitting the optical radiation into a reference radiation portion and a measurement radiation portion;
   (c) transmitting the measurement radiation portion into an optical fiber having non-zero Rayleigh scatter;
   (d) collecting the backward Rayleigh scattered light;
   (e) joining the reference and measurement radiation portions at the input of the optical detector in order to produce an interference fringe;
   (f) measuring the interference fringe over a plurality of wavelengths to produce a reference pattern;
   (g) measuring the interference fringe over a plurality of wavelengths after the optical fiber has been subjected to strain or compression so as to produce a measurement pattern;
   (h) computing the Fourier Transform of the reference pattern as a function of wavenumber so as to produce a reference spatial domain response;
   (i) computing the Fourier Transform of the measurement pattern as a function of wavenumber so as to produce a measurement spatial domain response;
   (j) selecting the complex points associated with a segment of the measurement spatial domain response and a corresponding segment of the reference spatial domain response; and (k) comparing the segment of the measurement spatial domain response to the corresponding segment of the reference spatial domain response to determine strain in the segment of optical fiber that corresponds to the measurement spatial domain response.

2. The method according to claim 1 wherein providing step (a) further comprises the step of providing a control system having a memory storage device, the method further comprising the steps of storing the reference and measurement patterns in the memory storage device.

3. The method according to claim 1 wherein the optical radiation source comprises a tunable laser, the measuring step (f) comprises the steps of:
- tapping a portion of the optical radiation outputted by the tunable laser;
- splitting the tapped portion of the optical radiation into a first optical radiation portion and a second optical radiation portion;
- transmitted the first optical radiation portion through a first delay and the second optical radiation portion through a second delay;
- thereforeafter, joining the first and second optical radiation portions at the input of the optical detector so as to produce interference fringes;
- measuring changes in the laser wavelength of the tunable laser using the interference fringes; and
- correlating the intensity measurements of the reference pattern using the measured changes in the laser wavelength.

4. A method for measuring the strain in an optical fiber comprising the steps of:
- (a) providing an optical radiation source configured to transmit optical radiation over a plurality of contiguous predetermined wavelength ranges, and an optical detector;
- (b) splitting the optical radiation into a reference radiation portion and a measurement radiation portion;
- (c) transmitting the measurement radiation portion into an optical fiber having non-zero Rayleigh scatter;
- (d) collecting the backward Rayleigh scattered light;
- (e) joining the reference and measurement radiation portions at the input of the optical detector in order to produce an interference fringe;
- (f) measuring the interference fringe over a plurality of wavelengths to produce a reference pattern;
- (g) measuring the interference fringe over a plurality of wavelengths after the optical fiber has been subjected to strain or compression so as to produce a measurement pattern;
- (h) computing the Fourier Transform of the reference pattern as a function of wavenumber so as to produce a reference spatial domain response;
- (i) computing the Fourier Transform of the measurement pattern as a function of wavenumber so as to produce a measurement spatial domain response;
- (j) selecting the complex points associated with a segment of the measurement spatial domain response and a corresponding segment of the reference spatial domain response;
- (k) performing an inverse Fourier Transform of the segment of the measurement spatial domain response to provide a first transformation;
- (l) performing an inverse Fourier Transform of the segment of the reference spatial domain response to provide a second transformation;
- (m) determining the complex cross-correlation between the first and second transformations;
- (n) determining the amplitude of the cross-correlation as a function of wavenumber shift; and
- (o) determining the wavenumber shift corresponding to a peak of the amplitude of the cross-correlation wherein such wavenumber shift indicates strain in the segment of the optical fiber that corresponds to the segments of the measurement and reference spatial domain responses.

5. A method for measuring the strain in an optical fiber comprising the steps of:
- (a) providing an optical radiation source configured to transmit optical radiation over a plurality of contiguous predetermined wavelength ranges, and an optical detector;
- (b) splitting the optical radiation into a reference radiation portion and a measurement radiation portion;
- (c) transmitting the measurement radiation portion into an optical fiber having non-zero Rayleigh scatter;
- (d) collecting the backward Rayleigh scattered light;
- (e) joining the reference and measurement radiation portions at the input of the optical detector in order to produce an interference fringe;
- (f) measuring the interference fringe over a plurality of wavelengths to produce a reference pattern;
- (g) measuring the interference fringe over a plurality of wavelengths after the optical fiber has been subjected to strain or compression so as to produce a measurement pattern;
- (h) computing the Fourier Transform of the reference pattern as a function of wavenumber so as to produce a reference spatial domain response;
- (i) computing the Fourier Transform of the measurement pattern as a function of wavenumber so as to produce a measurement spatial domain response;
- (j) selecting the complex points associated with a segment of the measurement spatial domain response and a corresponding segment of the reference spatial domain response;
- (k) computing the complex conjugate of all complex points in the selected segments of the spatial domain responses of the reference and measurement patterns;
- (l) computing the product of the complex conjugate of all complex points in the selected segment of the reference spatial domain responses and the complex conjugate of all complex points in the selected segment measurement patterns wherein the product comprises an array of product values;
- (m) computing the inverse Fourier Transform of the array of product values;
- (n) computing the amplitude of the array as a function of wavenumber shift; and
- (o) determining the wavenumber shift corresponding to the peak of the amplitude of the array wherein the wavenumber shift indicates strain in the section of optical fiber that corresponds to the segments of the measurement and reference spatial domain responses.

6. An apparatus for measuring the strain in an optical fiber comprising:
- an optical radiation source configured to transmit optical radiation over a plurality of continguous predetermined wavelength ranges;

an optical detector;

means for splitting the optical radiation into a reference radiation portion and a measurement radiation portion;

means for transmitting the measurement radiation portion into an optical fiber having non-zero Rayleigh scatter;

means for collecting the backward Rayleigh scattered light;

means for joining the reference and measurement radiation portions at the input of the optical detector in order to produce an interference fringe;

means for measuring the interference fringe over a plurality of wavelengths to produce a reference pattern;

means for measuring the interference fringe over a plurality of wavelengths to produce a reference pattern;

means for measuring the interference fringe over a plurality of wavelengths after the optical fiber has been subjected to strain or compression so as to produce a measurement pattern;

means for computing the Fourier Transform of the reference pattern as a function of wavenumber so as to produce a reference spatial domain response;

means for computing the Fourier Transform of the measurement pattern as a function of wavenumber so as to produce a measurement spatial domain response;

means for selecting the complex points associated with a segment of the measurement spatial domain response and a corresponding segment of the reference spatial domain response; and means for comparing the segment of the measurement spatial domain response to the corresponding segment of the reference spatial domain response to determine strain in the segment of optical fiber being measured.

7. The apparatus according to claim 6 wherein the comparing means comprises:

means for performing an inverse Fourier Transform of the segment of the measurement spatial domain response to provide a first transformation;

means for performing an inverse Fourier Transform of the segment of the reference spatial domain response to provide a second transformation;

means for determining the complex cross-correlation between the first and second transformations;

means for determining the amplitude of the cross-correlation as a function of wavenumber shirt; and means for determining the wavenumber shift corresponding to a peak of the amplitude of the cross-correlation wherein such wavenumber shift indicates train in the segment of the optical fiber being measured.

8. An apparatus according to claim 6 wherein the comparing means comprises:

means for computing the complex conjugate of all complex points in the selected segments of the spatial domain responses of the reference and measurement patterns;

means for computing the product of the complex conjugate of all complex points in the selected segment of the reference spatial domain responses and the complex conjugate of all complex points in the selected segment measurement patterns wherein the product comprises an array of product values;

means for computing the inverse Fourier Transform of the array of product values;

means for computing the amplitude of the array as a function of wavenumber shift; and means for determining the number of wavenumber shift corresponding to the peak of the amplitude of the array wherein the wavenumber shift indicates strain in the section of optical fiber being measured.

9. An article of manufacture comprising:

a computer processor usable medium having computer processor readable program code embodied therein for measuring strain in an optical fiber using an apparatus comprising a computer processor, an optical radiation source configured to transmit optical radiation over a plurality of contiguous predetermined wavelength ranges, optical radiation couplers, optical radiation reflectors, and an optical detector, the computer processor readable program code in the article of manufacture comprising:

computer processor readable program code configured to enable the apparatus to transmit optical radiation over a plurality of contiguous predetermined wavelength ranges;

computer processor readable program code configured to enable the apparatus to split the optical radiation into a reference radiation portion and a measurement radiation portion;

computer processor readable program code configured to enable the apparatus to transmit the measurement radiation portion into an optical fiber having non-zero Rayleigh scatter;

computer processor readable program code configured to cause the apparatus to collect the backward Rayleigh scattered light;

computer processor readable program code configured to enable the apparatus to join the reference and measurement radiation portions at the input of the optical detector in order to produce an interference fringe;

computer processor readable program code configured to cause the apparatus to measure the interference fringe over a plurality of wavelengths to produce a reference pattern;

computer processor readable program code configured to cause the apparatus to measure of the interference fringe over a plurality of wavelengths after the optical fiber has been subjected to strain or compression so as to produce a measurement pattern;

computer processor readable program code configured to cause the apparatus to compute the Fourier Transform of the reference pattern as a function of wavenumber so as to produce a reference spatial domain response;

computer processor readable program code configured to cause the apparatus to compute the Fourier Transform of the measurement pattern as a function of wavenumber so as to produce a measurement spatial domain response;

computer processor readable program code configured to cause the apparatus to select the complex points associated with a segment of the measurement spatial domain response and a corresponding segment of the reference spatial domain response;

computer processor readable program code configured to cause the apparatus to compute the inverse Fourier Transform of the segment of the measurement spatial domain response to provide a first transformation;

computer processor readable program code configured to cause the apparatus to compute the inverse Fourier Transform of the segment of the reference spatial domain response to provide a second transformation;

computer processor readable program code configured to cause the apparatus to determine the complex cross-correlation between the first and second transformations;

computer processor readable program code configured to cause the apparatus to determine the amplitude of the cross-correlation as a function of wavenumber shift; and computer processor readable program code configured to cause the apparatus to determine the wavenumber shift corresponding to a peak of the amplitude of the cross-correlation wherein such wavenumber shift indicates strain in the segment of the optical fiber that corresponds to the segments of the measurement and reference spatial domain responses.

10. An article of manufacture comprising:

a computer processor usable medium having computer processor readable program code embodied therein for measuring strain in an optical fiber using an apparatus comprising a computer processor, an optical radiation source configured to transmit optical radiation over a plurality of contiguous predetermined wavelength ranges, optical radiation couplers, optical radiation reflectors, and an optical detector, the computer processor readable program code in the article of manufacture comprising:

computer processor readable program code configured to enable the apparatus to split the optical radiation into a reference radiation portion and a measurement radiation portion;

computer processor readable program code configured to enable the apparatus to transmit the measurement radiation portion into an optical fiber having non-zero Rayleigh scatter;

computer processor readable program code configured to cause the apparatus to collect the backward Rayleigh scattered light;

computer processor readable program code configured to enable the apparatus to join the reference and measurement radiation portions at the input of the optical detector in order to produce an interference fringe;

computer processor readable program code configured to cause the apparatus to measure the interference fringe over a plurality of wavelengths to produce a reference pattern;

computer processor readable program code configured to cause the apparatus to treasure the interference fringe over a plurality of wavelengths after the optical fiber has been subjected to strain or compression so as to produce a measurement pattern;

computer processor readable program code configured to cause the apparatus to compute the Fourier Transform of the reference pattern as a function of wavenumber so as to produce a reference spatial domain response;

computer processor readable program code configured to cause the apparatus to compute the Fourier Transform of the measurement pattern as a function of wavenumber so as to produce a measurement spatial domain response;

computer processor readable program code configured to cause the apparatus to select the complex points associated with a segment of the measurement spatial domain response and a corresponding segment of the reference spatial domain response;

computer processor readable program code configured to cause the apparatus to compute the complex conjugate of all complex points in the selected segments of the spatial domain responses of the reference and measurement patterns;

computer processor readable program code configured to cause the apparatus to compute the product of the complex conjugate of all complex points in the selected segment of the reference spatial domain responses and the complex conjugate of all complex points in the selected segment measurement patterns wherein the product comprises an array of product values;

computer processor readable program code configured to cause the apparatus to compute of the inverse Fourier Transform of the array of product values;

computer processor readable program code configured to cause the apparatus to determine the amplitude of the array as a function of wavenumber shift; and computer processor readable program code configured to cause the apparatus to determine the wavenumber shift corresponding to the peak of the amplitude of the array wherein the wavenumber shift indicates strain in the section of optical fiber that corresponds to the segments of the measurement and reference spatial domain responses.

\* \* \* \* \*